United States Patent [19]

Buschor et al.

[11] Patent Number: 4,788,850
[45] Date of Patent: Dec. 6, 1988

[54] BOTTLE TESTING APPARATUS

[75] Inventors: Josef J. Buschor; James C. Long, both of San Jose, Calif.

[73] Assignee: Five X Corporation, San Jose, Calif.

[21] Appl. No.: 34,549

[22] Filed: Apr. 6, 1987

[51] Int. Cl.⁴ .............................................. G01M 3/02
[52] U.S. Cl. ......................................... 73/49.2; 73/37; 73/41
[58] Field of Search ................... 73/49.2, 37, 40, 49.8, 73/49.1, 744, 41; 141/264, 266, 250, 263

[56] References Cited

U.S. PATENT DOCUMENTS

| Re. 31,385 | 9/1983 | Schmidt | 73/37 |
|---|---|---|---|
| 1,346,604 | 7/1920 | Manning | 73/744 |
| 3,879,987 | 4/1975 | Yasuhiro et al. | 73/41 |
| 3,995,473 | 12/1976 | Flamand et al. | 73/49.2 |
| 4,144,742 | 3/1979 | Schmidt et al. | 73/37 |
| 4,294,107 | 10/1981 | Walle | 73/49.2 |
| 4,459,843 | 7/1984 | Durham | 73/37 |

Primary Examiner—Stewart J. Levy
Assistant Examiner—Hezron E. Williams
Attorney, Agent, or Firm—Flehr, Hohbach, Test, Albritton & Herbert

[57] ABSTRACT

Apparatus utilizing pressurized liquid for testing containers such as soft drink beverage bottles for the ability to withstand internal pressure and for the absence of leakage. The pressurized liquid is introduced into each bottle with a swirling motion through an annular passageway and air is expelled from the bottle through a vent tube positioned coaxially within the passageway. The outer wall of the annular passageway is formed by a resilient sleeve which is compressed radially and extended axially by the pressurized liquid to provide a tight seal with the bottle. Pressure within the bottle is monitored by a sensing member which is displaced by the pressurized liquid and actuates a pivotally mounted lever arm which provides an amplified movement and corresponding to the displacement of the sensing member. In the disclosed embodiment, the apparatus is mounted on a rotary turret, and the introduction of the pressurized liquid and the expulsion of air are controlled by valves which are actuated automatically as the turret rotates between different positions.

22 Claims, 5 Drawing Sheets

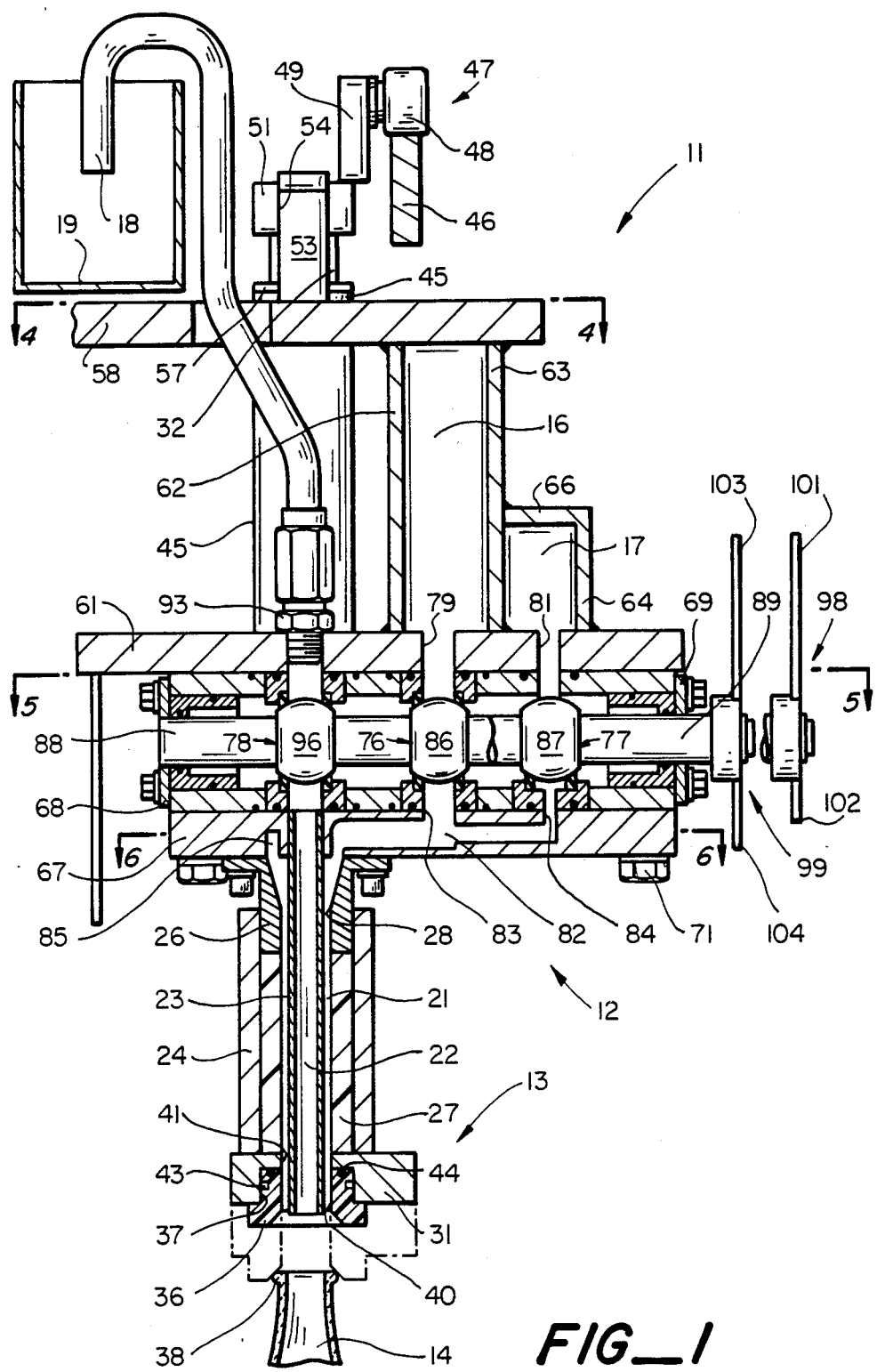
FIG_1

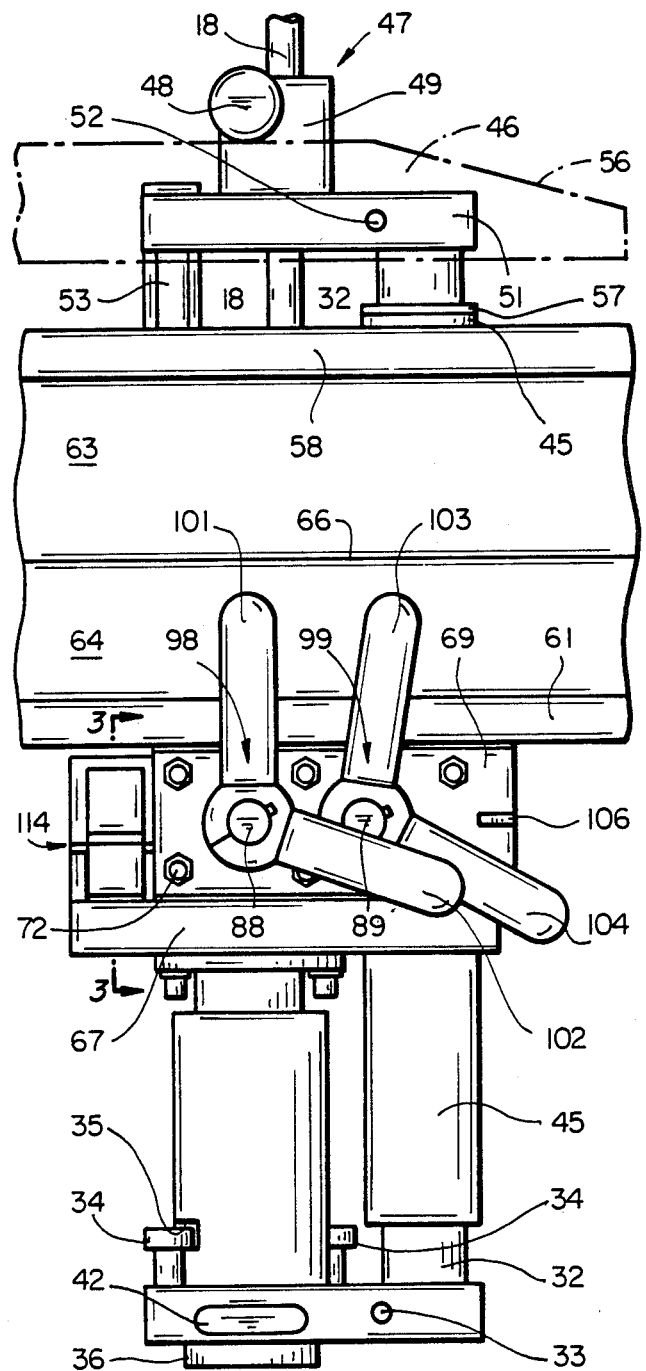
FIG_2

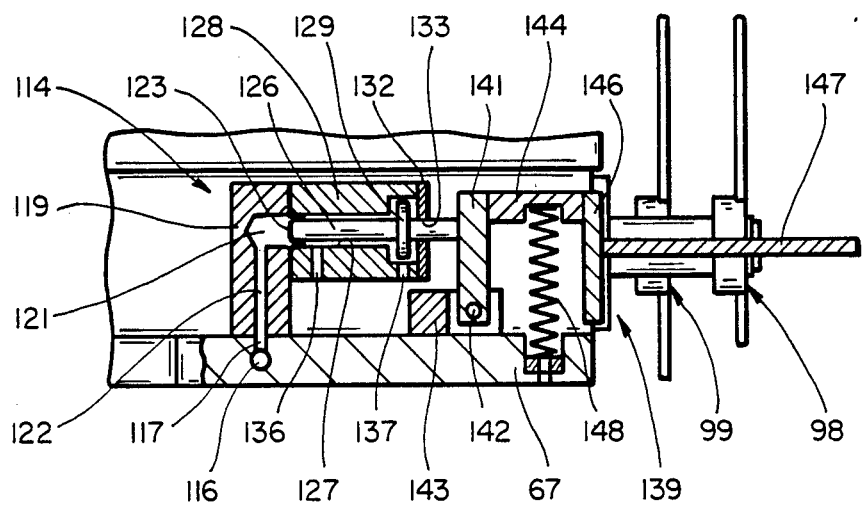
FIG_3
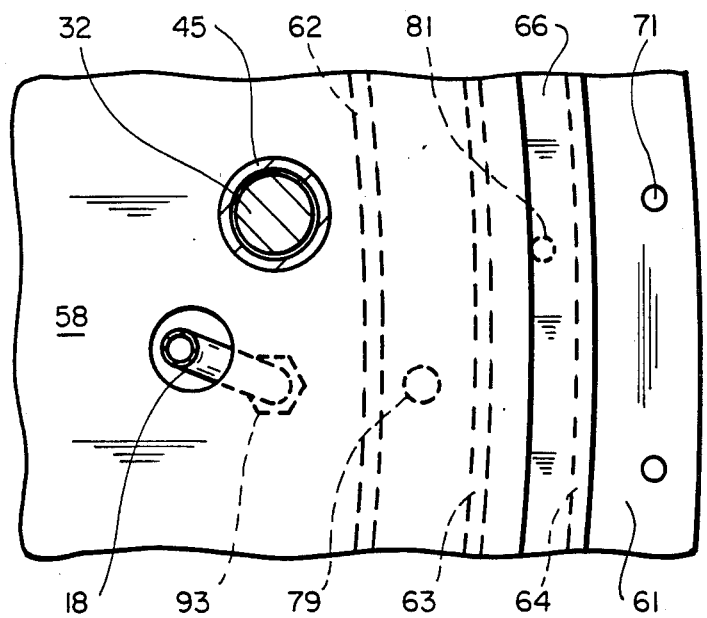
FIG_4

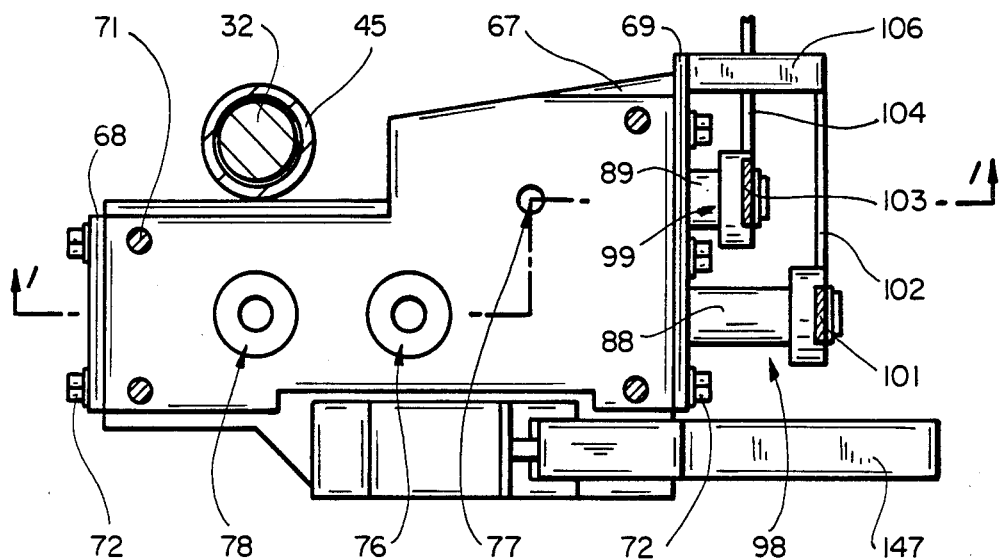
FIG_5
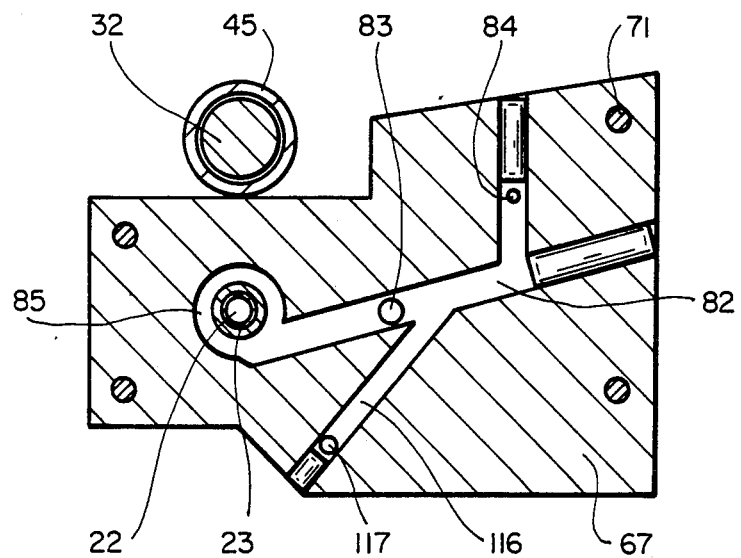
FIG_6

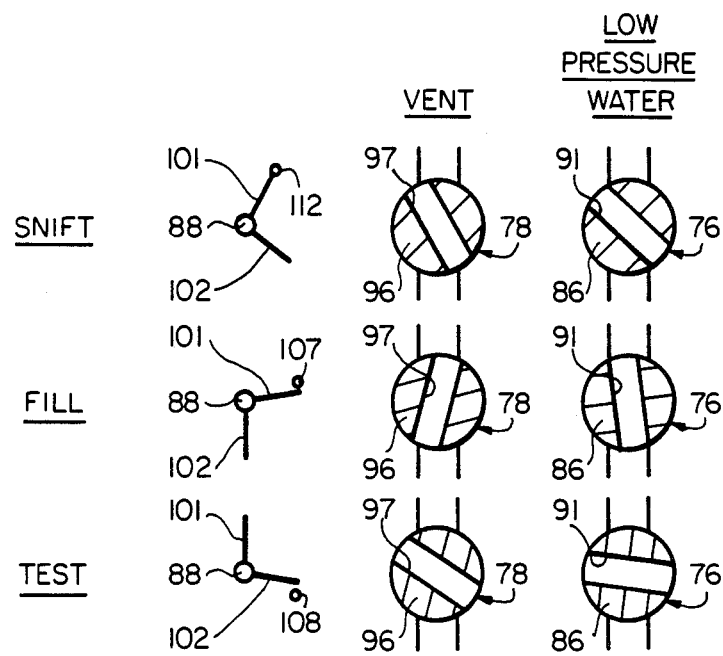
FIG_7
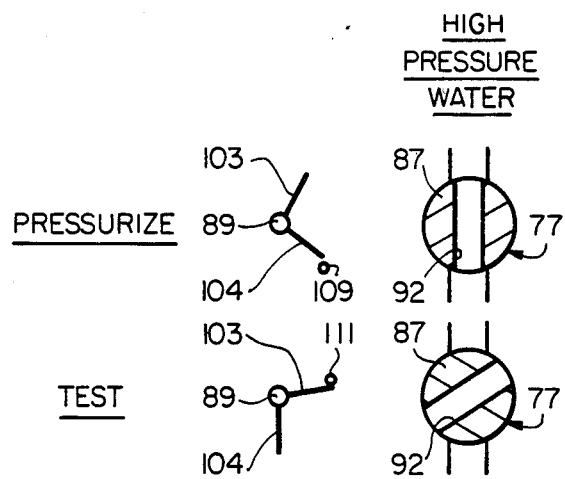
FIG_8

BOTTLE TESTING APPARATUS

BACKGROUND OF THE INVENTION

This invention pertains generally to the testing of containers such as soft drink beverage bottles, and more particular to apparatus for testing such containers for the ability to withstand internal pressure and for the absence of leaks.

Heretofore, several different approaches have been employed or suggested for testing bottles for beverages such as soft drinks and other similar containers. The purpose of such testing is to determine whether the bottles are sufficiently strong to resist internal pressure and are free of defects which may cause leaks.

These approaches have included the application of mechanical pressure to the exterior of a bottle and the application of pneumatic pressure to the interior of a bottle. Each of these approaches has certain limitations and disadvantages. It is difficult to apply a mechanical pressure uniformly over the entire exterior of a bottle, and it is also difficult to detect defects in the crown of the bottle which may cause leaks. With an internally applied pneumatic pressure, when a bottle fails, it does so with explosive force, hurling pieces of broken glass which can injure nearby personnel and become lodged in the machinery.

U.S. Pat. Nos. 3,826,126 and Re. 31,385 disclose a better approach in which a bottle is first filled with low pressure water to expel air and other gases from the bottle, following which high pressure water is introduced into the bottle and the ability of the bottle to withstand the pressure without leakage or other failure is observed. This approach has the advantage of accurately simulating the pressure to which the bottle is subjected when it is filled with product and capped, and it also avoids the danger of exploding glass in the event that the bottle should fail. While this approach represents a definite improvement over the other prior art approaches for testing bottles, this approach still has certain limitations and disadvantages.

SUMMARY OF THE INVENTION

It is in general an object of the present invention to provide a new and improved apparatus for testing containers such as soft drink beverage bottles for the ability to withstand internal pressure and the absence of leakage.

Another object of the invention is to provide apparatus of the above character which overcomes the limitations and disadvantages of bottle testing apparatus heretofore provided.

These and other objects are achieved in accordance with the invention by providing bottle testing apparatus in which pressurized liquid is introduced into each bottle with a swirling motion through an annular passageway and air is expelled from the bottle through a vent tube positioned coaxially within the passageway. The outer wall of the annular passageway is formed by a resilient sleeve which is compressed radially and extended axially by the pressurized liquid to provide a tight seal with the bottle. Pressure within the bottle is monitored by a sensing member which is displaced by the pressurized liquid and actuates a pivotally mounted lever arm which provides an amplified movement and corresponding to the displacement of the sensing member. In the disclosed embodiment, the apparatus is mounted on a rotary turret, and the introduction of the pressurized liquid and the expulsion of air are controlled by valves which are actuated automatically as the turret rotates between different positions.

BRIEF DESCRIPTION OF THE DRAWINGS

FIG. 1 is a vertical sectional view of one embodiment of bottle testing apparatus according to the invention, taken along line 1—1 in FIG. 5.

FIG. 2 is a side elevational view of the embodiment of FIG. 1.

FIG. 3 is a fragmentary cross-sectional view taken along line 3—3 in FIG. 2.

FIG. 4 is a cross-sectional view taken along line 4—4 in FIG. 1.

FIG. 5 is a cross-sectional view taken along line 5—5 in FIG. 1.

FIG. 6 is a cross-sectional view taken along line 6—6 in FIG. 1.

FIGS. 7 and 8 are schematic diagrams illustrating the operating sequence of the valves which control the delivery of pressurized liquid to the bottles in the embodiment of FIG. 1.

DESCRIPTION OF THE PREFERRED EMBODIMENT

Although the drawings illustrate only a single testing head 11, a plurality of such testing heads are spaced about the periphery of a rotary turret in one presently preferred embodiment, e.g. 42 testing heads on a turret having a diameter of 66 inches. The turret has pockets for receiving bottles in succession from a bottle entry conveyor and conveying the bottles to an exit conveyor which carries the bottles to another processing unit such as a washer which cleans the bottles before they are transported to a filling machine and thence to a capping machine. As the bottles progress around the turret, they are filled with pressurized liquid and tested in the manner discussed hereinafter in detail. With suitable modification, the invention can also be employed in an in-line system in which there is a single stationary testing head which the bottles move as they travel along a line. For most applications, however, the rotary turret system is preferred since it has a higher throughput of bottles.

The testing head has a body 12 which is affixed to and rotates with the turret and a probe which can be extended and retracted vertically into and out of engagement with a bottle 14 to be tested. The vertical travel of the probe is relatively limited, e.g. 0.5 inch, and the entire turret assembly can be raised and lowered to accommodate bottles of different heights.

Pressurized liquid for testing the bottles is provided by a pair of circular manifolds 16, 17 which are positioned coaxially of each other on the turret and rotate with the turret. These manifolds are connected to all of the testing heads on the machine. The liquid can be any suitable non-compressible liquid, and one particularly suitable liquid for testing the bottles is water. Manifold 16 is connected to a source of water at a relatively low pressure (e.g. 45 psig), and manifold 17 is connected to a source of water at relatively high pressure (e.g. 150 psig).

Air and water displaced from a bottle are discharged through an overflow tube 18 which empties into a circular trough 19 which is mounted in a stationary position and does not rotate with the turret. The upper end of the overflow tube is turned down and travels within the trough as the turret rotates.

Probe 13 includes an annular passageway 21 through which the pressurized liquid from manifolds 16, 17 is introduced into the bottle and an inner passageway 22 through which air and water are discharged from the bottle. These passageways are formed by a vertically extending vent tube 23 positioned coaxially within an outer cylindrical sleeve 24. Tube 23 is mounted in a fixed position in body 12, and sleeve 24 is slidably mounted on a flange 26 on the lower side of the body. A second sleeve 27 is positioned coaxially within sleeve 24, and the annular passageway is formed between the outer wall of tube 23 and the inner wall of sleeve 27. The upper end of sleeve 27 abuts against the lower end of flange 26, and the annular passageway extends through an annular bore 28 in the flange. The lower portion of the bore has a diameter equal to the inner diameter of sleeve 27, and the upper portion of the bore is flared conically. The lower ends of sleeves 24 and 27 abut against the upper surface of a generally rectangular plate 31 which is affixed to the lower end of a vertically extending shaft 32 by a pin 33. Sleeve 24 and plate 31 are retained together somewhat loosely by a pair of shoulder bolts 34 which are threadedly mounted in the plate, with the heads of the bolts being received in a pair of diametrically opposed slots 35 in the outer wall of the sleeve.

A seal 36 fabricated of a resilient material such as rubber or a resilient plastic is mounted in a socket 37 on the underside of plate 31 for sealing engagement with the crown 38 of the bottle to be tested. This seal has an axial bore 40 which is aligned with the opening in sleeve 27 and with a bore 41 in plate 31. The seal is chamfered at the lower end of bore 40 to facilitate alignment of the seal with the bottle and to accommodate bottles having crowns of different sizes. Vent tube 23 extends through the bores in plate 31 and seal 36, and annular passageway 21 likewise extends through the plate and the seal.

Seal 36 is retained in socket 37 by means of a U-shaped clip 42 which has a pair of generally parallel legs (not shown) which are received in a peripheral groove 43 in the side wall of the seal. An O-ring 44 provides a fluid-tight seal between the upper end of seal 36 and the end wall of socket 37.

Probe 13 moves between the raised or retracted position illustrated in FIG. 1 and an extended or bottle engaging position shown in phantom lines in FIG. 1. The probe is urged in a downward direction by gravity and by an axial force exerted by sleeve 27 which is fabricated of a resilient material such as rubber. This sleeve is slightly longer than outer sleeve 24 and it is compressed axially between flange 26 and plate 31. The relative lengths of the sleeves are such that the resilient sleeve is compressed slightly even when the probe is in its fully extended position, with the amount of compression increasing as the probe is raised. An additional axial force is exerted on seal 36 by sleeve 27 due to axial elongation of the resilient sleeve as it is compressed radially by the pressurized liquid in annular passageway 21. This axial elongation produces a tighter seal between seal 36 and the crown of the bottle as the pressure within the bottle is increased.

Shaft 32 is mounted in a vertically extending guide tube 45 which is affixed to the turret, with suitable bushings and seals (not shown) between the shaft and the tube permitting the shaft to move axially within the tube.

Probe 13 is raised and lowered by means of a cam 46 and a cam follower 47 at the upper end of shaft 32. The cam is mounted in a stationary position in the path of the testing head as the turret rotates about its axis. The cam follower comprises a roller 48 mounted on a bracket 49 affixed to a plate 51 at the upper end of the shaft. The plate is secured to the shaft by a pin 52, and a guide post 53 is received in a slotted opening 54 in the end of the plate opposite the shaft. Cam 46 has an upwardly facing ramp 56 which engages roller 48 to lift the shaft and the probe as the turret rotates. Downward movement of the probe is limited by abutment of plate 51 against a cushion 57 at the upper end of guide tube 45. Guide post 53 is affixed to a plate 58, and guide tube 45 passes through an opening in this plate.

Manifolds 16, 17 are formed between plate 58 and an intermediate annular plate 61 by concentric cylindrical side walls 62–64, with plates 58, 61 forming the top and bottom walls of manifold 16 and plate 61 forming the bottom wall of manifold 17. The top wall of manifold 17 is formed by an annular plate 66. The plates and cylindrical walls are joined together by suitable means such as welding to form a unitary structure which is part of the rotating turret assembly.

Body 12 has a bottom plate 67, an inner side plate 68, and an outer side plate 69. The body is secured to turret plate 61 by screws 71, and side plates 68, 69 are secured to the remainder of the body by screws 72.

Communication between manifolds 16, 17 and annular passageway 21 and between passageway 22 and overflow tube 18 is controlled by valve assemblies 76–78 mounted in body 12. Manifolds 16, 17 communicate with the inlet sides of valve assemblies 76, 77 through bores 79, 81 in plate 61. The outlet sides of these valve assemblies communicate with a passageway 82 in lower plate 67 through vertical bores 83, 84 in the plate. In the embodiment illustrated, passageway 82 is formed by drilling holes into the plate from the edges of the plate and plugging the outer ends of the boreholes. Passageway 82 tangentially intersects an annular chamber 85 which opens through the lower side of plate 67 in axial alignment with the upper end of the bore 8 in flange 26. The annular chamber thus forms a continuation of annular passageway 21. Valve assemblies 6, 77 have valve members or balls 86, 87 mounted on shafts 88, 89 with bores 91, 92 which can be rotated into and out of alignment with the inlet and outlet openings of the valves.

Overflow tube 18 is connected to a fitting 93 which is threadedly mounted in plate 61 in axial alignment with vent tube 23 and with the inlet and outlet openings of valve assembly 78. This valve assembly has a valve member or ball 96 with a bore 97 which can be rotated into and out of alignment with the inlet and outlet openings of that valve. Valve member 96 is mounted on the same shaft as valve member 86 (i.e. shaft 88), and valve assemblies 76, 78 thus operate together.

Means is provided for sequentially operating valve assemblies 76–78 as the turret rotates. This means includes operating levers 98, 99 affixed to the ends of valve shafts 88, 89 and pins mounted in stationary positions on the machine for engagement with the operating levers as the levers travel past the pins. Each of the operating levers comprises a pair of radially extending arms oriented at an angle slightly greater than 90° relative to each other. Thus, operating lever 98 has arms 101, 102, and operating lever 99 has arms 103, 104. A stop 106 projects from side plate 69 and is positioned for engagement by the lever arms to define limiting positions in the rotation of the valves. When the testing head is in position to receive or discharge a bottle, the valve assemblies are in a rest position in which water valves 76, 77 are both closed and vent valve 78 is open. This corresponds to the SNIFT position for valve assemblies 76, 78 illustrated in FIG. 7 and the TEST position for valve assembly 77 illustrated in FIG. 8. As the turret rotates to begin a testing cycle, a pin 107 engages lever arm 101 and rotates valve assemblies 76, 78 in a clockwise direction through an angle of 46° from the SNIFT position to the FILL position illustrated in FIG. 7. At a later point in the rotation of the turret, a pin 108 engages lever arm 102 and rotates valve assemblies 76, 78 through an angle of 72° in the counterclockwise direction from the FILL position to the TEST position illustrated in FIG. 7. Thereafter, a pin 109 engages lever arm 104 to rotate valve assembly 77 through an angle of 52° in the counterclockwise direction from the TEST position to the PRESSURIZE position illustrated in FIG. 8. At a subsequent point, a pin 111 engages lever arm 103 to rotate valve assembly 77 through an angle of 52° in the clockwise direction from the PRESSURIZE position back to the TEST position illustrated in FIG. 8. At a subsequent point in the rotation of the turret, a pin 112 engages lever arm 101 to rotate valve assemblies 76, 78 through an angle of 26° in the clockwise direction from the TEST position back to the SNIFT position shown in FIG. 7. With the valves back in their rest positions, the machine is ready to discharge the bottle which has been tested and to receive a new bottle to begin the next testing cycle.

Means is provided for monitoring the pressure within the bottle being tested. This means comprises a sensor assembly 114 which is mounted on plate 67 in fluid communication with the interior of the bottle. This communication is provided by a horizontal passageway 116 which intersects passageway 82 in plate 67 and by a vertical bore 117 which intersects passageway 116. Passageway 116 is formed by drilling a hole in the plate and plugging the outer end of the hole.

Pressure sensor 114 comprises a block 119 in which a chamber 121 and a passageway 122 are formed, with passageway 122 being aligned axially with bore 117 in plate 67. One wall of chamber 121 is formed by a rolling diaphragm 123 which moves in and out in accordance with the pressure in the bottle.

The outer side of diaphragm 123 engages one end of an axially movable rod 126 mounted in a bore 127 in a block 128 which is affixed to block 119 with the peripheral edge portion of diaphragm 123 being clamped between the confronting surfaces of the two blocks. Axial movement of the operating rod is limited by a radial flange 129 which is received in a cavity 131 at the outer end of bore 127. This cavity is closed by a cover plate 132 having an opening 133 through which the outer end of rod 126 extends. Blocks 119, 128 and cover plate 132 are secured together by screws (not shown). Vent openings 136 and 137 communicate with bore 127 and chamber 131, respectively.

A lever arm assembly 139 is actuated by rod 126 to provide an amplified movement corresponding to the displacement of diaphragm 123. This assembly includes an input arm 141 pivotally mounted on a pin 142 which extends between the arms of a U-shaped fulcrum block 143 mounted on plate 67. The outer end of rod 126 bears against the outer surface of this arm. A horizontal arm 144 is affixed to the upper end of arm 141, and a vertical arm 146 extends in a downward direction from the outer end of arm 144. An output arm 147 extends horizontally from vertical arm 146. Arms 141, 144, 146 and 147 are joined together by suitable means such as welding to form a rigid structure. A compression spring 148 confined between plate 67 and arm 144 urges the lever assembly to pivot in a counterclockwise direction toward rod 126. The position of the free end of output arm 147, and hence the pressure in the bottle, is monitored by a sensor (not shown) mounted in a stationary position on the machine.

Operation of the bottle testing apparatus is as follows. As the testing head moves into position to receive a bottle 14 from the input conveyor, cam 46 engages roller 48, lifting probe 13 to its retracted position. With the bottle positioned beneath the probe, roller 48 leaves the cam, and seal 36 is pressed into sealing engagement with the crown 38 of the bottle by resilient sleeve 27. As the turret continues its rotation, lever arm 101 engages valve actuating pin 107 to rotate shaft 88 and thereby open valves 76 and 78. The low pressure water from manifold 16 passes through valve 76 and passageway 82 and enters annular chamber 85 in a tangential direction. The water rotates around tube 23 as it passes through annular passageway 21, and it enters the bottle with a swirling motion. The swirling water tends to enter along the side wall of the bottle, displacing air out through the center of the bottle into passageway 22. The filling operation continues until all of the air has been displaced from the bottle and some water has overflowed into trough 19.

When the filling operation is complete, pin 108 engages arm 102 to close low pressure water valve 76 and vent valve 78. Thereafter, pin 109 engages lever arm 104 to open valve 77. With this valve open and the other valves closed, the interior of the bottle is pressurized by the high pressure water from manifold 17. The pressurized water compresses resilient sleeve 27 radially against outer sleeve 24, causing the sleeve to elongate axially. This axial elongation urges seal 36 in a downward direction, thereby tightening the seal between the probe and the crown of the bottle. When the bottle has been pressurized, pin 111 engages arm 103 to close valve 77.

As the pressure in the bottle increases, diaphragm 123 is displaced in an outward direction by the pressurized water. This causes operating rod 126 to move in an outward direction, pivoting lever assembly 139 in a clockwise direction, as viewed in FIG. 3. Since the distance between pivot pin 142 and the outer end of lever arm 147 is greater than the distance between the pivot pin and the point at which rod 126 engages arm 141, the movement of the free end of arm 147 is greater than the movement of rod 126. Thus, the displacement of diaphragm 23 is multiplied at the free end of lever arm 147. When the bottle has been pressurized, the testing head travels past a sensor (not shown) which monitors the position of the outer end of lever arm 147 and, hence, the pressure in the bottle.

After the pressure has been checked, pin 112 engages lever arm 101 to open vent valve 78 and thereby release the pressure from the bottle. Thereafter, roller 48 engages cam 46, lifting the probe out of engagement with the bottle. The bottle is then transferred from the turret to the exit conveyor or rejected, depending on the condition of the bottle, and a new bottle is introduced from the inlet conveyor.

The invention has a number of important features and advantages. The test probe travels a relatively short distance (e.g. 0.5 inch or less), and there is no quill or other member which must be extended into the bottles as in prior art machines. This substantially increases the speed with which the bottles can be tested. The swirling motion of the water entering the bottle helps to displace air from the bottle, and the seal between the probe and the bottle tends to tighten as the pressure within the bottle increases. The use of a rubber sleeve as both a spring and a seal avoids the need for sliding parts in contact with the test water. With returnable bottles, this water can be very dirty and damaging to the sliding parts. In addition, the amplified movement of the pressure sensor provides increased resolution and sensitivity over the unamplified sensors employed in machines of the prior art. It is apparent from the foregoing that a new and improved apparatus for testing bottles has been provided. While only one presently preferred embodiment has been described in detail, as will be apparent to those familiar with the art, certain changes and modifications can be made without departing from the scope of the invention as defined by the following claims.

We claim:

1. In apparatus for testing a container with pressurized liquid: a seal member movable axially between sealing and retracted positions relative to the container and having an opening through which the pressurized liquid can be introduced into the container, a passageway communicating with the opening in the seal member for carrying the pressurized liquid to the container, and a resilient sleeve forming the outer wall of the passageway and being adapted to be compressed radially and elongated axially by the pressurized liquid to urge the seal member into sealing engagement with the container.

2. The apparatus of claim 1 including a vent tube positioned within the resilient sleeve, with the passageway for the pressurized liquid being formed between the outer wall of the vent tube and the inner wall of the resilient sleeve.

3. The apparatus of claim 2 including means for introducing low pressure liquid into the container through the passageway with the vent tube open to permit gas to escape from the container, first valve means for closing the vent tube after the container has been filled with the low pressure liquid, means for introducing high pressure liquid into the container through the passageway while the vent tube is closed, second valve means for closing the passageway after the high pressure liquid has been introduced, and means for monitoring the pressure in the container when both the vent tube and the passageway are closed.

4. The apparatus of claim 3 wherein the means for monitoring the pressure in the container includes a diaphragm positioned for displacement by the pressurized liquid and a pivotally mounted lever arm actuated by the diaphragm for providing an amplified movement corresponding to the displacement of the diaphragm.

5. The apparatus of claim 1 including means for introducing the pressurized liquid into the passageway in a tangential direction so that the liquid is introduced into the container with a swirling motion.

6. In apparatus for testing a container with pressurized liquid: an annular passageway for introducing the pressurized liquid into the container, a seal member at the distal end of the annular passageway for sealing engagement with the container, a sleeve of resilient material forming the outer wall of the annular passageway and being adapted to be compressed radially and extending axially by the pressurized liquid to tighten the seal between the seal member and the container, a vent tube positioned coaxially of the annular passageway for venting gas from the container, a source of low pressure liquid, a source of high pressure liquid, a first valve for controlling communication between the source of the low pressure liquid and the passageway, a second valve for selectively opening and closing the vent tube, a third valve for controlling communication between the source of high pressure liquid and the passageway, means for sequentially opening and closing the valves to fill the container with the low pressure liquid as gas is expelled through the vent tube and thereafter introducing the high pressure liquid into the container with the vent tube closed to pressurize the container, and means for monitoring the pressure in the container.

7. The apparatus of claim 6 wherein the apparatus is mounted on a rotary turret, the valves have operating levers, and the means for sequentially opening and closing the valves comprises actuator pins mounted in predetermined stationary positions for engagement with the operating levers as the turret rotates.

8. The apparatus of claim 7 wherein two of the valves are connected to a common shaft and operated by the control lever connected to that shaft.

9. The apparatus of claim 6 wherein the means for monitoring the pressure in the container comprises a diaphragm positioned to be displaced by the pressurized liquid, and a pivotally mounted lever arm actuated by the diaphragm for providing an amplified movement corresponding to the displacement of the diaphragm.

10. The apparatus of claim 6 including a passageway extending between the first and third valves and the annular passageway and intersecting the annular passageway in a tangential direction so that the liquid is introduced into the annular passageway and the container with a swirling motion.

11. In apparatus for testing a container with pressurized liquid: means for introducing pressurized liquid into the container, a seal member engageable with the container, means comprising a resilient member which is exposed to the pressurized liquid in such manner that it is compressed radially and extended axially by the pressurized liquid, a sensing member exposed to the pressurized liquid an being adapted to be displaced by an amount corresponding to the pressure of the liquid in the container, and a pivotally mounted lever arm actuated by the sensing member for providing an amplified movement corresponding to the displacement of the sensing member.

12. The apparatus of claim 11, wherein the sensing member comprises a rolling diaphragm.

13. The apparatus of claim 11, including an operating rod positioned between the sensing member and the lever arm, and means yieldably urging the rod into engagement with the sensing member and lever arm.

14. The apparatus of claim 11 including an annular passageway for introducing the pressurized liquid into the container and an additional passageway which intersects the annular passageway in a tangential direction for introducing the pressurized liquid into the annular passageway and the container with a swirling motion, the sensing member being in fluid communication with one of the passageways.

15. The apparatus of claim 14 including a vent tube positioned coaxially within the annular passageway for venting gas from the container.

16. The apparatus of claim 11 wherein the resilient member forms a wall of a passageway through which the pressurized liquid is introduced into the container.

17. In apparatus for testing a container with pressurized liquid: a seal member engageable with the container, an axially compressed sleeve of resilient material urging the seal member toward the container, means for moving the seal member away from the container against the compressive force of the resilient sleeve, and means for introducing a pressurized liquid into the container through aligned openings in the resilient sleeve and the seal member.

18. The apparatus of claim 17 including means for limiting radial expansion of the resilient sleeve so that the sleeve is compressed radially and extended axially by the pressurized liquid.

19. The apparatus of claim 17 including a vent tube positioned coaxially within the resilient sleeve for venting gas from the container.

20. The apparatus of claim 19 including means for introducing the pressurized liquid into the resilient sleeve with a tangential component of velocity so that the liquid enters the container with a swirling motion.

21. The apparatus of claim 17 including means for monitoring the pressure within the container.

22. The apparatus of claim 21 wherein the means for monitoring the pressure comprises a sensing member positioned for displacement in accordance with the pressure within the container, and a lever arm responsive to displacement of the sensing member for providing an amplified movement corresponding to the displacement of the sensing member.

* * * * *